US011356971B2

(12) United States Patent
Miyake et al.

(10) Patent No.: US 11,356,971 B2
(45) Date of Patent: Jun. 7, 2022

(54) WIRELESS COMMUNICATION SYSTEM, WIRELESS COMMUNICATION METHOD, AND STORAGE MEDIUM OF THE SYSTEM

(71) Applicant: Mitsubishi Electric Corporation, Tokyo (JP)

(72) Inventors: Yuji Miyake, Tokyo (JP); Tetsuya Aoyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/129,119

(22) Filed: Dec. 21, 2020

(65) Prior Publication Data

US 2021/0112511 A1 Apr. 15, 2021

Related U.S. Application Data

(63) Continuation of application No. PCT/JP2018/026206, filed on Jul. 11, 2018.

(51) Int. Cl.
*H04W 56/00* (2009.01)
*H04W 52/02* (2009.01)
*H04W 52/14* (2009.01)

(52) U.S. Cl.
CPC ... *H04W 56/0015* (2013.01); *H04W 52/0206* (2013.01); *H04W 52/143* (2013.01); *H04W 56/0045* (2013.01)

(58) Field of Classification Search
CPC ......... H04W 56/0015; H04W 52/0206; H04W 52/143; H04W 56/0045

(Continued)

(56) References Cited

U.S. PATENT DOCUMENTS 6,363,128 B1 * 3/2002 Isaksson ............. H04L 27/2675
375/376
2014/0013048 A1 * 1/2014 Biederman ........... G06F 11/108
711/114

(Continued)

FOREIGN PATENT DOCUMENTS

JP 5-308333 A 11/1993
JP 8-289359 A 11/1996

(Continued)

*Primary Examiner* — Nghi H Ly
(74) *Attorney, Agent, or Firm* — Birch, Stewart, Kolasch & Birch, LLP

(57) ABSTRACT

In a wireless communication system including a plurality of wireless base stations, the wireless base stations other than the uppermost wireless base station among the plurality of wireless base stations each determine a frame timing on the basis of synchronization timing information received from the upper wireless base station, and the wireless base stations other than the lowermost wireless base station among the plurality of wireless base stations each notify the lower wireless base station of the synchronization timing information. A communication path from the uppermost wireless base station to the lowermost wireless base station includes a branch point and a merge point, and a junction base station that is the wireless base station installed at the merge point measures a synchronization error between a priority synchronization path and a non-priority synchronization path different from the priority synchronization path, the priority synchronization path being one of a plurality of the communication paths from the branch point to the merge point. Each of the plurality of wireless base stations installed on the non-priority synchronization path adjusts the frame timing on the basis of the synchronization error.

13 Claims, 9 Drawing Sheets

(58) Field of Classification Search
USPC .............. 370/350, 329, 328, 338, 341, 345
See application file for complete search history.

(56) References Cited

U.S. PATENT DOCUMENTS

| 2015/0327202 | A1* | 11/2015 | Xu | H04L 5/1469 |
| | | | | 370/280 |
| 2016/0165560 | A1 | 6/2016 | Takeda et al. | |
| 2018/0219640 | A1* | 8/2018 | Kerpez | H04J 3/10 |

FOREIGN PATENT DOCUMENTS

| JP | 2011-103600 A | 5/2011 |
| JP | 2015-26897 A | 2/2015 |

\* cited by examiner

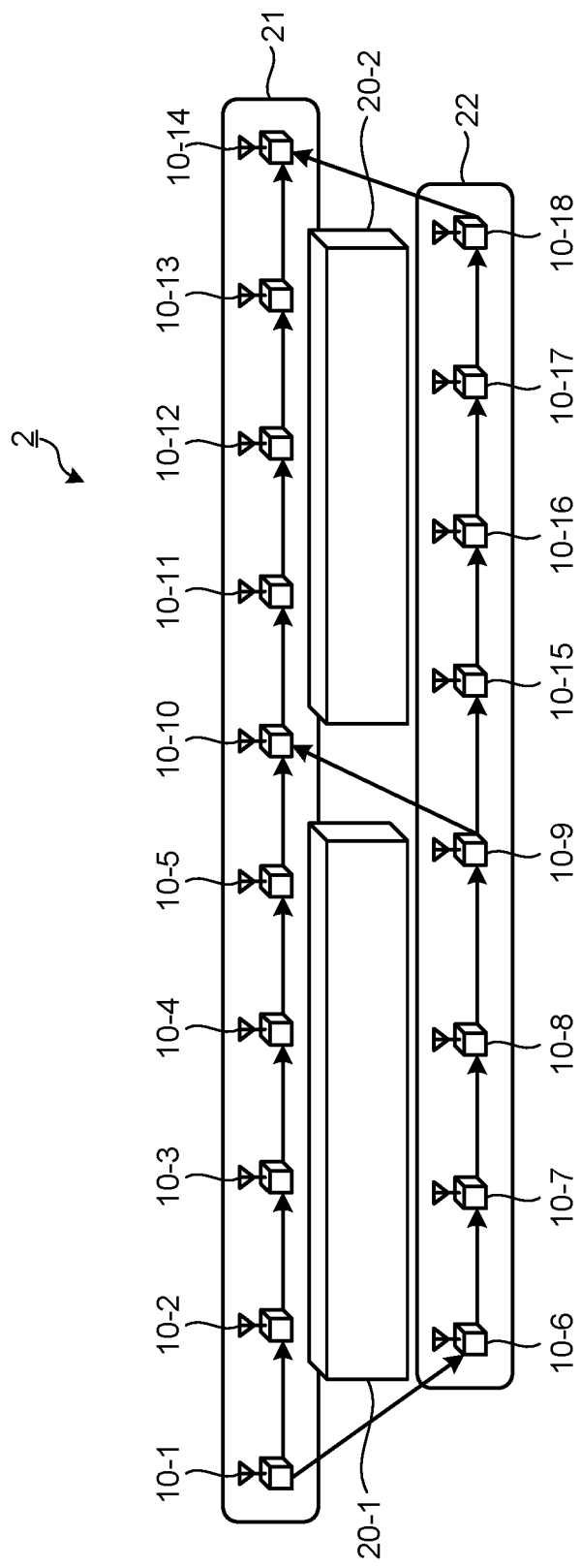

WIRELESS COMMUNICATION SYSTEM, WIRELESS COMMUNICATION METHOD, AND STORAGE MEDIUM OF THE SYSTEM

CROSS-REFERENCE TO RELATED APPLICATION

This application is a continuation application of International Application PCT/JP2018/026206, filed on Jul. 11, 2018, and designating the U.S., the entire contents of which are incorporated herein by reference.

BACKGROUND OF THE INVENTION

1. Field of the Invention

The disclosure relates to a wireless communication system and a wireless communication method for synchronizing wireless base stations, and to a program recording medium.

2. Description of the Related Art

A wireless base station of a wireless communication system needs to have the transmission frame timing in synchronization with a neighboring wireless base station in order to avoid interference between the wireless base stations and achieve a handover that allows a wireless mobile terminal to seamlessly switch the wireless base stations with which the wireless mobile terminal communicates. The wireless base stations need to synchronize the transmission frame timing not only in the case of a wireless communication system using a time division multiple access (TDMA) but also in the case of a wireless communication system using, for example, frequency hopping or code division multiple access (CDMA) having time or frequency shared between the wireless base stations and between wireless mobile terminals.

In one method of synchronizing a plurality of wireless base stations, a frame timing, which is a timing of transmission/reception of the start of a frame, is generated on the basis of a reception timing of a wireless frame received from an adjacent wireless base station. Each wireless base station uses an oscillator to generate a synchronization signal, and the oscillator has an inherent frequency error. This causes an error in transmitting the wireless frame. For a wireless base station capable of communicating with a plurality of adjacent wireless base stations, as a result, the frame timing generated from the reception timing of the frame from one of the wireless base stations may be different from the frame timing generated from the reception timing of the frame from another one of the wireless base stations. Japanese Patent Application Laid-open No. H08-289359 discloses a technique in which a wireless base station capable of communicating with a plurality of adjacent wireless base stations can synchronize with the plurality of adjacent wireless base stations by using an average or a median of a plurality of reception timings as the frame timing.

Unfortunately, according to the technique described in Japanese Patent Application Laid-open No. H08-289359, where a synchronization path is separated into a plurality of synchronization paths by an obstruction, and then the plurality of synchronization paths merges, the error in the frame timing is accumulated independently for each synchronization path, which leads to an increase in a synchronization error between the synchronization paths at the merge point. In this case, if a wireless base station installed at the merge point uses the average or the median of the plurality of reception timings as the frame timing, the synchronization error between the wireless base station at the merge point and each of the plurality of adjacent wireless base stations becomes greater than or equal to an allowable timing difference, which leads to a loss of synchronization.

The disclosure has been made in view of the above, and an object of the disclosure is to provide a wireless communication system capable of resolving a loss of synchronization at a merge point of a plurality of synchronization paths where a synchronization path of a wireless base station is separated into the plurality of synchronization paths by an obstruction and an error in a frame timing is accumulated.

SUMMARY OF THE INVENTION

To solve the above problem and achieve the object, a wireless communication system according to the disclosure comprises a plurality of wireless base stations, wherein wireless base stations other than an uppermost wireless base station among the plurality of wireless base stations each determine a frame timing on the basis of synchronization timing information received from an upper wireless base station, and wireless base stations other than a lowermost wireless base station among the plurality of wireless base stations each notify the lower wireless base station of the synchronization timing information, a communication path from the uppermost wireless base station to the lowermost wireless base station includes a branch point and a merge point, a junction base station that is the wireless base station installed at the merge point measures a synchronization error between a priority synchronization path and a non-priority synchronization path different from the priority synchronization path, the priority synchronization path being one of a plurality of communication paths from the branch point to the merge point, and the wireless base station installed on the non-priority synchronization path adjusts the frame timing on the basis of the synchronization error.

BRIEF DESCRIPTION OF THE DRAWINGS

FIG. 13 is a diagram illustrating a configuration of a wireless communication system according to a second embodiment.

DETAILED DESCRIPTION OF THE PREFERRED EMBODIMENTS

A wireless communication system and a wireless communication method according to embodiments will now be described in detail with reference to the drawings.

First Embodiment

Figure 1:
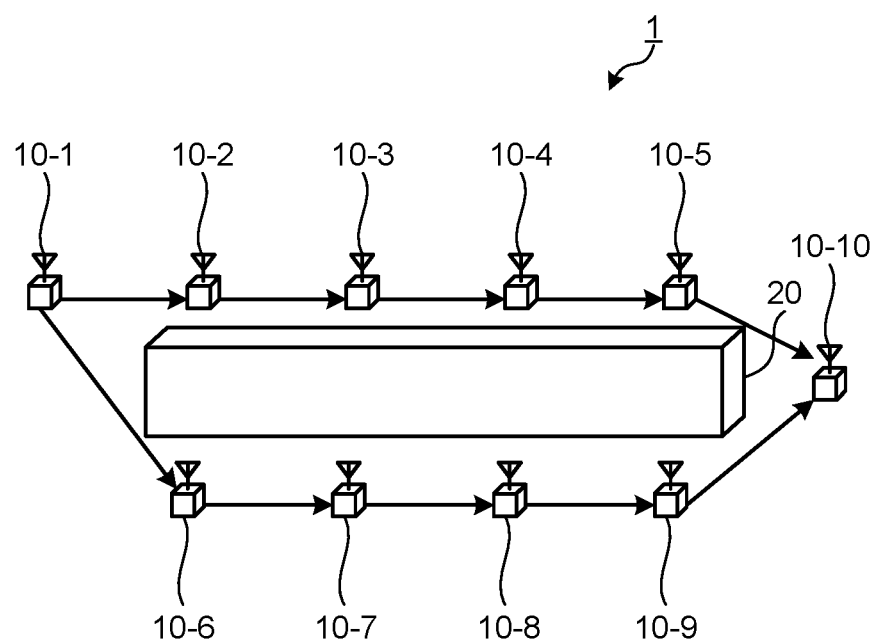
FIG. 1 is a diagram illustrating a configuration of a wireless communication system according to a first embodiment.

FIG. 1 is a diagram illustrating a configuration of a wireless communication system 1 according to a first embodiment. The wireless communication system 1 includes a plurality of wireless base stations 10-1 to 10-10. Hereinafter, the wireless base stations 10-1 to 10-10 will be referred to as wireless base stations 10 when need not be distinguished from each other.

Of the wireless base stations 10-1 to 10-10, the wireless base stations 10-2 to 10-10, which are wireless base stations other than the uppermost wireless base station, each determine a frame timing on the basis of synchronization timing information received from the upper one of the adjacent wireless base stations 10. The frame timing is a timing of transmission/reception of the start of a frame. Of the wireless base stations 10-1 to 10-10, the wireless base stations 10-1 to 10-9, which are wireless base stations other than the lowermost wireless base station, each notify the lower wireless base station 10 of the synchronization timing information based on the determined frame timing. As a result, the frame timings can be synchronized among the plurality of wireless base stations 10. Arrows illustrated between the plurality of wireless base stations 10 in FIG. 1 indicate the relationship between the wireless base stations 10, and the wireless base station 10 on the left side of the arrow is upper relative to the wireless base station 10 on the right side of the arrow. For example, the wireless base station 10-2 determines the frame timing on the basis of the synchronization timing information received from the upper wireless base station 10-1 of the adjacent wireless base stations 10-1 and 10-3, and notifies the lower wireless base station 10-3 of the synchronization timing information based on the determined frame timing. Note that although not illustrated, the wireless base station 10 may be disposed above the wireless base station 10-1, and/or the wireless base station 10 may be disposed below the wireless base station 10-10.

Each wireless base station 10 uses an oscillator to generate a synchronization signal, and the oscillator has an inherent frequency error. This causes an error in the timing at which each wireless base station 10 transmits the start of the frame in transmitting the synchronization timing information. The frequency error increases due to a temperature change, aging, and the like. As for a synchronization path from the uppermost wireless base station 10-1 to the lowermost wireless base station 10-10, there exists the wireless base station 10 receiving pieces of the synchronization timing information from a plurality of the wireless base stations 10 adjacent thereto. Such a wireless base station 10, which has received the pieces of the synchronization timing information, can correct the error in the frame timing, using these plural pieces of the synchronization timing information. A method of correcting the error in the frame timing includes, for example, a method that takes an average or a median, of a plurality of frame timings each determined from a corresponding one of the plurality of pieces of the synchronization timing information.

Where the wireless base stations 10-2 to 10-5 is isolated from the wireless base stations 10-6 to 10-9 by a radio-wave-opaque obstruction 20 that is impervious to radio waves, as illustrated in FIG. 1, for example, the synchronization path is divided or separated into a path through the wireless base stations 10-2 to 10-5 and a path through the wireless base stations 10-6 to 10-9. The wireless base station 10-10 can communicate with both of the wireless base stations 10-5 and 10-9. Such a situation can occur in a railroad environment, road environment, or indoor environment such as a factory having the obstruction 20 such as a tunnel or a building.

In that case, the error in the frame timing is accumulated independently in each of the two separate synchronization paths, which leads to an increase in a synchronization error that is a difference between two frame timings each generated from a corresponding one of two pieces of the synchronization timing information received by the wireless base station 10-10 that is a junction base station installed at a merge point of the plurality of synchronization paths. Where the wireless base station 10 is disposed in a tunnel or indoor environment, a Global Positioning System (GPS) cannot be used to correct the frame timing.

Figure 2:
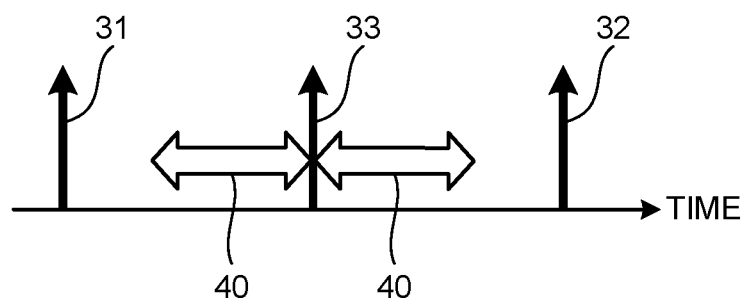
FIG. 2 is an explanatory diagram of a frame timing generated by a wireless base station that is installed at a merge point of synchronization paths of the wireless communication system illustrated in FIG. 1.

FIG. 2 is an explanatory diagram of the frame timing generated by the wireless base station 10-10 that is installed at the merge point of the synchronization paths of the wireless communication system 1 illustrated in FIG. 1. The wireless base station 10-10 receives the synchronization timing information from each of the wireless base stations 10-5 and 10-9. The accumulation of the error in the frame timing in each synchronization path increases the synchronization error that is a difference between a frame timing 31 based on the synchronization timing information received from the wireless base station 10-5 and a frame timing 32 based on the synchronization timing information received from the wireless base station 10-9. In this case, a difference between a frame timing 33 that is an average of the frame timings 31 and 32 and each of the frame timings 31 and 32 becomes larger than a maximum allowable synchronization error 40, resulting in a loss of synchronization.

Upon occurrence of the loss of synchronization, the wireless communication system 1 experiences interference due to overlapping of the transmission frame timing with the adjacent wireless base station 10 when using the TDMA or frequency hopping method, experiences inter-symbol interference when using the code division multiple access (CDMA), or experiences inter-channel interference when using the FDMA. Moreover, when the loss of synchronization occurs, a wireless terminal may fail to perform a handover between the adjacent wireless base stations 10. Therefore, the present embodiment proposes a method of resolving the loss of synchronization in the wireless base station 10-10 installed at the merge point of the synchronization paths even where the synchronization path of the wireless base station 10 is separated into the plurality of synchronization paths by the obstruction 20 and the synchronization error is accumulated.

Figure 3:
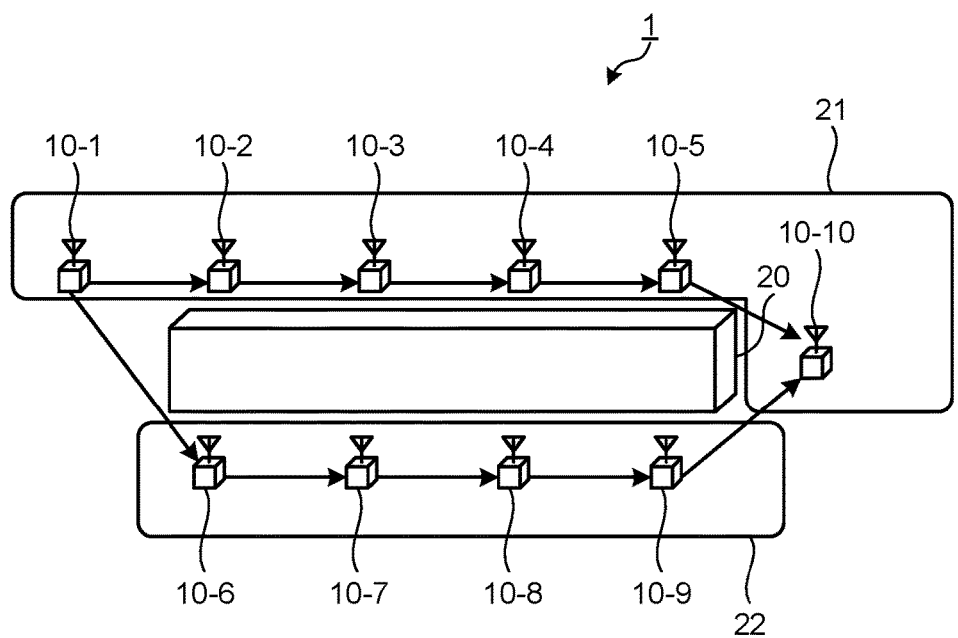
FIG. 3 is an explanatory diagram of the synchronization paths of the wireless communication system illustrated in FIG. 1.

FIG. 3 is an explanatory diagram of the synchronization paths of the wireless communication system 1 illustrated in FIG. 1. In the wireless communication system 1, the synchronization paths from the upper wireless base station 10 to the lower wireless base station 10 includes a priority synchronization path 21 through the wireless base stations 10-1 to 10-5 and 10-10, and a non-priority synchronization path 22 through the wireless base stations 10-6 to 10-9. The wireless base station 10-10 that is the junction base station measures the synchronization error between the priority synchronization path 21 and the non-priority synchronization path 22. Then, each of the wireless base stations 10-6 to 10-9 on the non-priority synchronization path 22 adjusts the frame timing on the basis of the measured synchronization error.

Specifically, the wireless base station 10-10 notifies the upper wireless base station 10-9 on the non-priority synchronization path 22 of timing adjustment information based on the synchronization error measured by the wireless base station 10-10 and indicative of an amount of adjustment of the frame timing. When notified of the timing adjustment information, the wireless base station 10-9 adjusts, on the basis of that timing adjustment information, the frame timing generated from the synchronization timing information received from the upper wireless base station 10-8. The wireless base station 10-9 notifies the wireless base station 10-8 of the timing adjustment information. Each of the wireless base stations 10-8, 10-7, and 10-6 adjusts the frame timing on the basis of the timing adjustment information received from the lower wireless base station 10 and the synchronization timing information received from the upper wireless base station 10.

Figure 4:
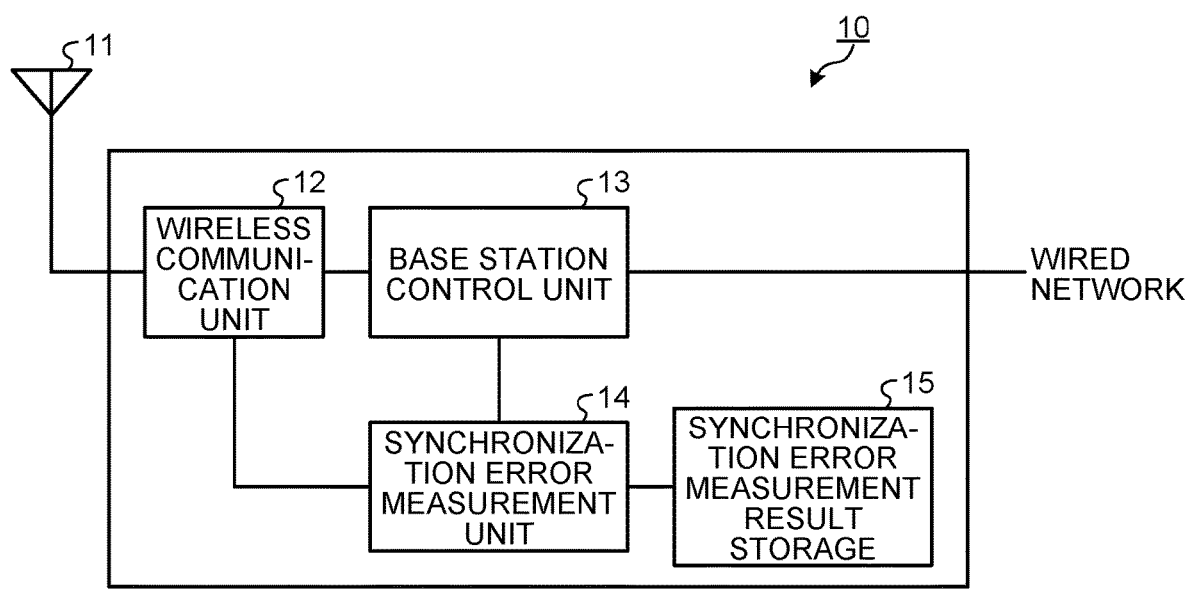
FIG. 4 is a diagram illustrating a functional configuration of the wireless base station of the wireless communication system illustrated in FIG. 3.

A configuration for implementing the wireless communication system 1 as described above will be described. FIG. 4 is a diagram illustrating a functional configuration of the wireless base station 10 of the wireless communication system 1 illustrated in FIG. 3. The wireless base station 10 includes an antenna 11, a wireless communication unit 12, a base station control unit 13, a synchronization error measurement unit 14, and a synchronization error measurement result storage 15.

The antenna 11 radiates a wireless signal input from the wireless communication unit 12 into the air as a radio wave, and receives a wireless signal propagating in the air to input the received wireless signal to the wireless communication unit 12.

The wireless communication unit 12 performs reception processing such as demodulation and decoding on the wireless signal input from the antenna 11 and inputs, to the base station control unit 13 and the synchronization error measurement unit 14, the wireless signal subjected to the reception processing. The wireless communication unit 12 performs transmission processing such as encoding and modulation on transmit data input from the side of a wired network and inputs, to the antenna 11, the transmit data subjected to the transmission processing.

The base station control unit 13 is connected to a wireless base station control station (not illustrated) via the wired network. The wireless base station control station, which is a device outside the wireless base station 10, controls the wireless base station 10. The base station control unit 13 inputs transmit data input from the wireless base station control station to the wireless communication unit 12, and outputs information input from the wireless communication unit 12 to the wired network side. Note that the base station control unit 13 has information indicating whether the wireless base station 10 belongs to the priority synchronization path 21 or the non-priority synchronization path 22. The base station control unit 13 also has information indicating the upper wireless base station 10 and the lower wireless base station 10. These pieces of information are set when the wireless base station 10 is initialized.

On the basis of a received signal input from the wireless communication unit 12, the synchronization error measurement unit 14 measures, as a synchronization error, a difference between a transmission frame timing of the wireless base station 10 and a reception frame timing of the signal received by the wireless communication unit 12. The synchronization error measurement unit 14 notifies the base station control unit 13 of the measured synchronization error, and stores the measured synchronization error in the synchronization error measurement result storage 15. The synchronization error measurement result storage 15 stores the synchronization error measured by the synchronization error measurement unit 14.

Figure 5:
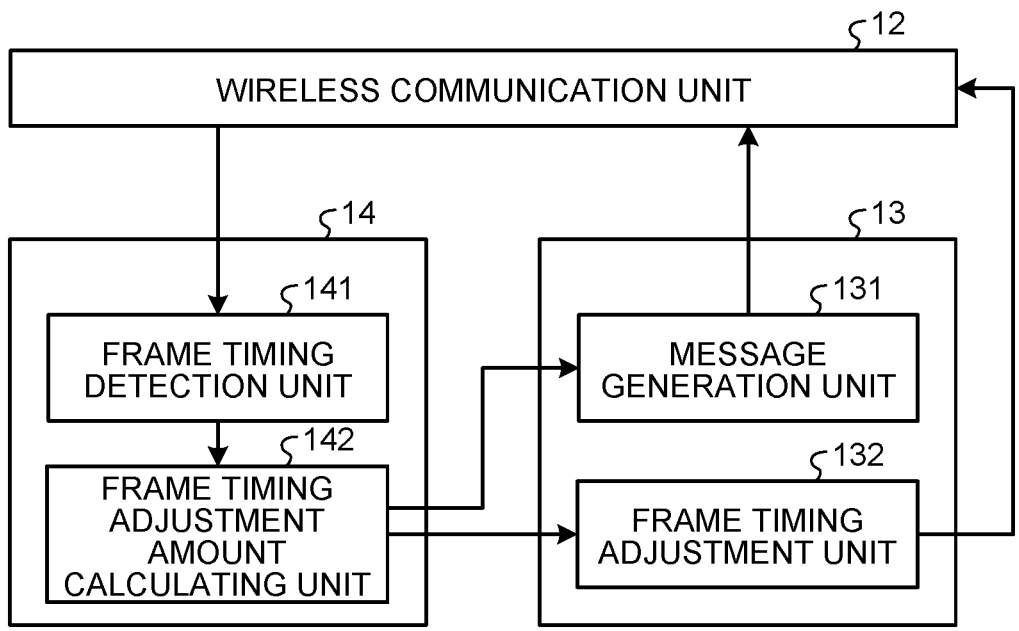
FIG. 5 is a diagram illustrating a detailed configuration of each of a base station control unit and a synchronization error measurement unit illustrated in FIG. 4.

FIG. 5 is a diagram illustrating a detailed configuration of each of the base station control unit 13 and the synchronization error measurement unit 14 illustrated in FIG. 4. The base station control unit 13 includes a message generation unit 131 and a frame timing adjustment unit 132. The synchronization error measurement unit 14 includes a frame timing detection unit 141 and a frame timing adjustment amount calculating unit 142.

The frame timing detection unit 141 detects the frame timing on the basis of the synchronization timing information contained in the received signal from the upper wireless base station 10. The synchronization timing information is transmitted from the upper wireless base station 10, using, for example, a control information message dedicated to synchronization or a notification information message for a wireless terminal (not illustrated). The notification information message is also called a beacon and is a message for a wireless terminal, and thus the wireless base station 10 acquires the notification information message by intercepting the message. The synchronization-dedicated control information message is broadcast. The frame timing detection unit 141 inputs the detected frame timing to the frame timing adjustment amount calculating unit 142.

The frame timing adjustment amount calculating unit 142 calculates a first frame timing adjustment amount for adjusting its own frame timing on the basis of the frame timing input from the frame timing detection unit 141, and inputs the calculated frame timing adjustment amount to the frame timing adjustment unit 132.

Where the wireless base station 10 is the junction base station or the wireless base station 10 on the non-priority synchronization path 22, the frame timing adjustment amount calculating unit 142 further calculates a second frame timing adjustment amount for the wireless base station 10 on the non-priority synchronization path 22 to adjust the frame timing, in addition to the first frame timing adjustment amount for correcting its own frame timing. In this case, the frame timing adjustment amount calculating unit 142 inputs the first frame timing adjustment amount to the frame timing adjustment unit 132 and inputs the second frame timing adjustment amount to the message generation unit 131.

In the example illustrated in FIG. 3, the wireless base station 10-10, which is the junction base station, receives the plurality of pieces of the synchronization timing information from the plurality of upper wireless base stations 10-5 and 10-9. The frame timing adjustment amount calculating unit 142 of the wireless base station 10-10 calculates the first frame timing adjustment amount on the basis of the synchronization timing information received from the upper wireless base station 10-5 on the priority synchronization path 21. The frame timing adjustment amount calculating unit 142 of the wireless base station 10-10 further calculates the second frame timing adjustment amount, using a difference between the frame timing detected on the basis of the synchronization timing information received from the upper wireless base station 10-5 on the priority synchronization path 21 and the frame timing detected on the basis of the synchronization timing information received from the upper wireless base station 10-9 on the non-priority synchronization path 22.

Moreover, in the example illustrated in FIG. 3, each of the wireless base stations 10-6 to 10-9 on the non-priority synchronization path 22 receives a message containing the timing adjustment information generated by the message generation unit 131 (to be described) from the lower wireless base station 10, and receives the synchronization timing information from the upper wireless base station 10. The frame timing adjustment amount calculating unit 142 of each of the wireless base stations 10-6 to 10-9 on the non-priority synchronization path 22 calculates the first frame timing adjustment amount and the second frame timing adjustment amount on the basis of the synchronization timing information received from the upper wireless base station 10 and the timing adjustment information.

Upon receiving the second frame timing adjustment amount from the frame timing adjustment amount calculating unit 142, the message generation unit 131 generates the message containing the timing adjustment information for instructing another one of the wireless base stations 10 to adjust the frame timing, on the basis of the second frame timing adjustment amount. The message generation unit 131 inputs the generated message to the wireless communication unit 12. The message generated by the message generation unit 131 is notified to the upper wireless base station 10 via the wireless communication unit 12 and the antenna 11.

Upon receiving the first frame timing adjustment amount from the frame timing adjustment amount calculating unit 142, the frame timing adjustment unit 132 adjusts its own frame timing on the basis of the first frame timing adjustment amount. The frame timing adjustment unit 132 notifies the wireless communication unit 12 of the adjusted frame timing. The wireless communication unit 12 is to perform transmission/reception using the frame timing received from the frame timing adjustment unit 132.

Figure 6:
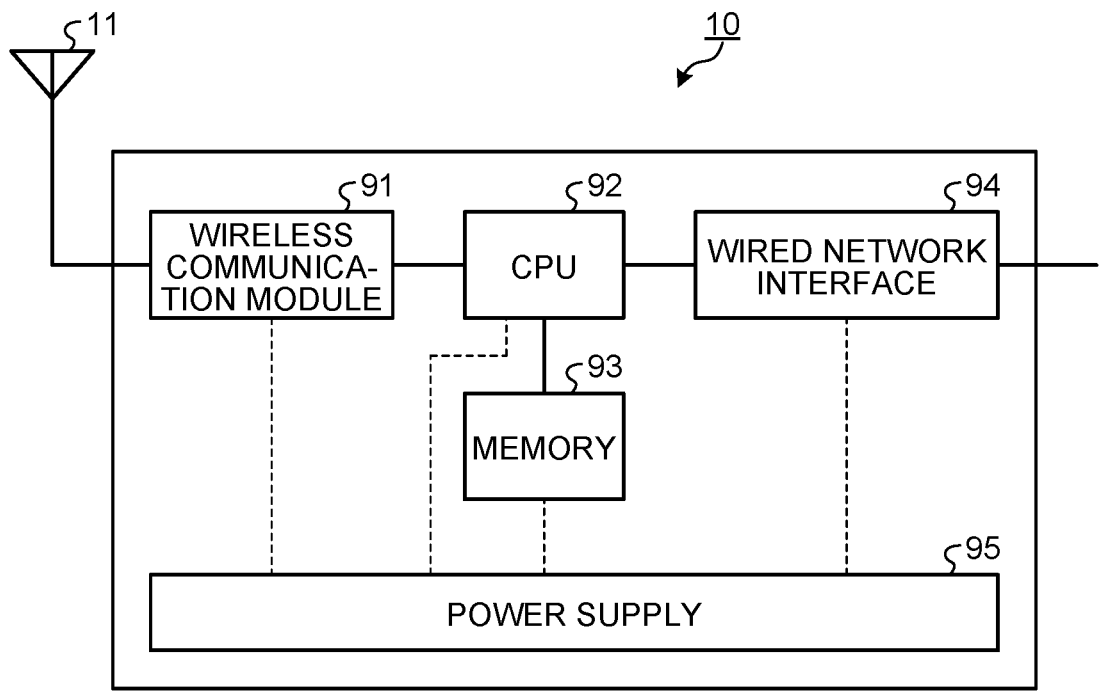
FIG. 6 is a diagram illustrating an example of a hardware configuration of the wireless base station illustrated in FIG. 4.

FIG. 6 is a diagram illustrating an example of a hardware configuration of the wireless base station 10 illustrated in FIG. 4. The wireless base station 10 includes the antenna 11, a wireless communication module 91, a central processing unit (CPU) 92, a memory 93, a wired network interface 94, and a power supply 95.

The wireless communication module 91 includes a high-frequency circuit and a modulation/demodulation circuit for wireless communication. The CPU 92 is a processor also referred to as a central processor, a processing unit, an arithmetic unit, a microprocessor, a microcomputer, a digital signal processor (DSP), or the like. The memory 93 includes a non-volatile or volatile semiconductor memory such as a random access memory (RAM), a read only memory (ROM), a flash memory, an erasable programmable ROM (EPROM), or an electrically EPROM (EEPROM (registered trademark)), a magnetic disk, or the like. The wired network interface 94 is an interface for connecting to the wired network. The power supply 95 supplies power to each of the wireless communication module 91, the CPU 92, the memory 93, and the wired network interface 94.

The wireless communication unit 12 is implemented using the wireless communication module 91. The base station control unit 13 and the synchronization error measurement unit 14 are implemented by the CPU 92 reading a computer program stored in the memory 93 and executing the read computer program. The memory 93 is also used as a temporary memory in each processing executed by the CPU 92. The synchronization error measurement result storage 15 is implemented by the memory 93.

Figure 7:
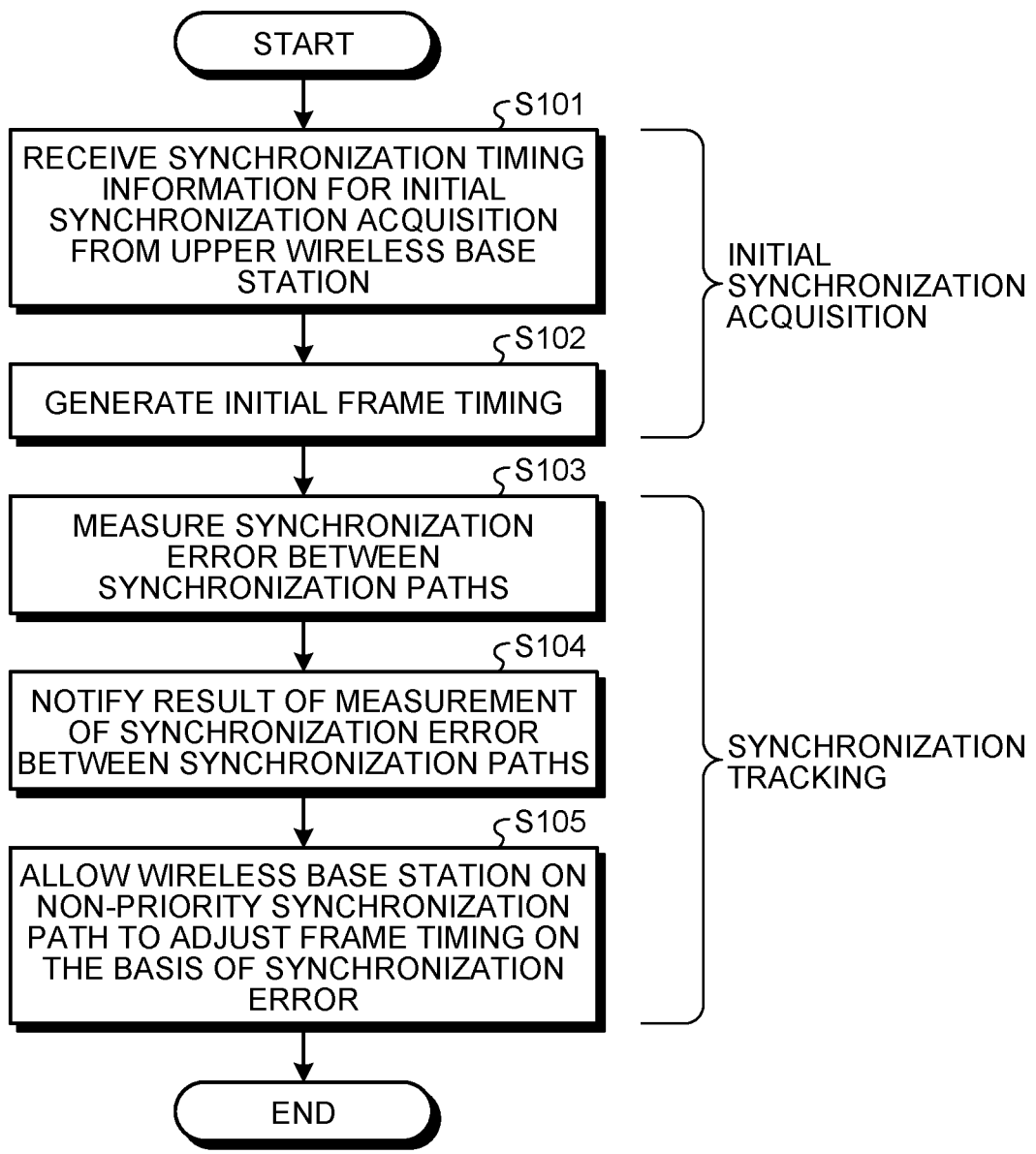
FIG. 7 is a flowchart illustrating an operation of the wireless communication system illustrated in FIG. 3.

FIG. 7 is a flowchart illustrating an operation of the wireless communication system 1 illustrated in FIG. 3. The processing illustrated in FIG. 7 starts when the power supply of the wireless base station 10 is turned on and when the wireless base station 10 restarts. First, each wireless base station 10 receives, from the upper wireless base station 10, synchronization timing information for initial synchronization acquisition (step S101). Upon receiving the synchronization timing information, each wireless base station 10 generates an initial frame timing on the basis of the received synchronization timing information (step S102). The processing of steps S101 and S102 is collectively referred to as initial synchronization acquisition process for establishing synchronization from an asynchronous state.

Specifically, the upper wireless base station 10 starts emitting radio waves after the power supply is turned on. A control message dedicated to synchronization or a notification information message, which is a message containing the synchronization timing information, is transmitted with the radio waves emitted from the upper wireless base station 10. The lower wireless base station 10 receives the synchronization timing information, and generates the initial frame timing, using the received synchronization timing information. After generating the initial frame timing, the lower wireless base station 10 starts emitting radio waves and transmits a synchronization-dedicated control message or a notification information message, which message contains the synchronization timing information.

In the example illustrated in FIG. 3, the processing of steps S101 and S102 is performed by the wireless base station 10-1 then by the wireless base stations 10-2, 10-3, 10-4, 10-5, and 10-10 in that order, and at the same time performed by the wireless base station 10-1 then by the wireless base stations 10-6, 10-7, 10-8, and 10-9 in that order.

Next, the wireless base station 10-10, which is the junction base station, measures the synchronization error between the synchronization paths, that is, between the priority synchronization path 21 and the non-priority synchronization path 22 (step S103). The wireless base station 10-10 notifies the upper wireless base station 10-9 on the non-priority synchronization path 22 of a result of the measurement of the synchronization error between the synchronization paths, and each wireless base station 10 on the non-priority synchronization path 22 sequentially notifies the upper wireless base station 10 of the result of the measurement (step S104). Each of the wireless base stations 10-6, 10-7, 10-8, and 10-9 on the non-priority synchronization path 22 adjusts the frame timing on the basis of the synchronization error (step S105). The processing of steps S103, S104, and S105 is collectively referred to as synchronization tracking process for maintaining and adjusting synchronization. The processing of step S105 is performed by the lower wireless base station 10 then by the upper wireless base station 10 on the non-priority synchronization path 22 in the order of the wireless base stations 10-9, 10-8, 10-7, and 10-6. The synchronization tracking processing is executed even when the wireless base station 10 is in the middle of system operation. In the middle of system operation, the wireless base station 10 and a wireless terminal in the vicinity thereof are communicating with each other.

Figure 8:
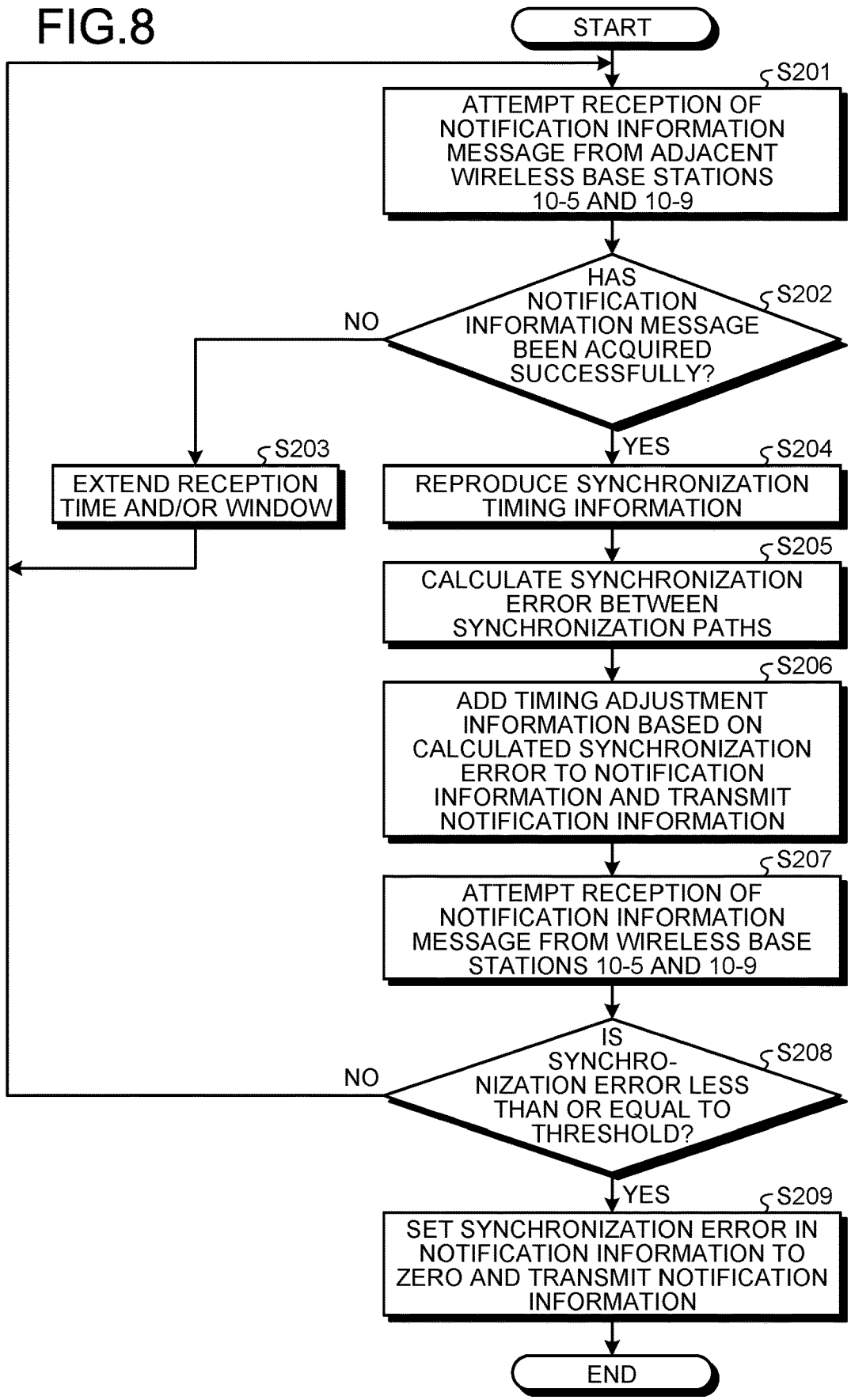
FIG. 8 is a flowchart illustrating a synchronization tracking operation of the wireless base station that is a junction base station illustrated in FIG. 3.

FIG. 8 is a flowchart illustrating the synchronization tracking operation of the wireless base station 10-10 that is the junction base station illustrated in FIG. 3. Note that, here, the message containing the synchronization timing information is the notification information message sent to a wireless terminal. The wireless base station 10-10 is in synchronization with only the wireless base station 10-5 in the initial synchronization acquisition.

The wireless base station 10-10 attempts to receive the notification information messages from the adjacent upper wireless base stations 10-5 and 10-9 (step S201). The wireless base station 10-10 then determines whether or not the notification information messages have been acquired successfully from both of the wireless base stations 10-5 and 10-9 (step S202). If having failed to acquire the notification information messages from both of the wireless base stations 10-5 and 10-9 (No in step S202), that is, if having failed to acquire the notification information message from at least one of the wireless base stations 10-5 and 10-9, the wireless base station 10-10 extends at least one of the reception time and the window (step S203), and returns to the processing of step S201.

If having acquired the notification information messages successfully from both of the wireless base stations 10-5 and 10-9 (Yes in step S202), the wireless base station 10-10 reproduces the synchronization timing information contained in the acquired notification information messages (step S204). The wireless base station 10-10 uses the reproduced synchronization timing information to calculate a synchronization error between the synchronization paths that is a difference between the frame timing of the wireless base station 10-5 on the priority synchronization path 21 and the frame timing of the wireless base station 10-9 on the non-priority synchronization path 22 (step S205).

The wireless base station 10-10 includes, in notification information, a piece of timing adjustment information indicating a second timing adjustment amount based on the calculated synchronization error, and transmits the notification information message (step S206). The timing adjustment information includes, for example, information indicating whether or not a synchronization error exists, and the second timing adjustment amount. The notification information message transmitted by the wireless base station 10-10 is received by the wireless base station 10-9, and the wireless base station 10-9 adjusts the frame timing. During this time, the wireless base station 10-10 attempts to receive the notification information messages transmitted by the wireless base stations 10-5 and 10-9 (step S207).

The wireless base station 10-10 determines whether or not the synchronization error calculated on the basis of the synchronization timing information contained in the notification information messages received is less than or equal to a threshold (step S208). If the synchronization error is less than or equal to the threshold (Yes in step S208), the wireless base station 10-10 sets the synchronization error in the notification information to zero and transmits the information (step S209). If the synchronization error exceeds the threshold (No in step S208), the wireless base station 10-10 repeats the processing from step S201.

Note that in step S206 described above, the wireless base station 10-10 may adjust its own frame timing before adding the timing adjustment information to the notification information. Specifically, the wireless base station 10-10 adjusts the frame timing generated on the basis of the synchronization timing information from the wireless base station 10-5, such that the adjusted frame timing becomes close to the frame timing generated on the basis of the synchronization timing information from the wireless base station 10-9.

Figure 9:
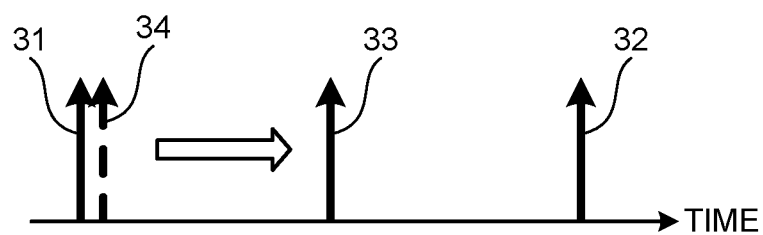
FIG. 9 is a diagram illustrating a first example of frame timing adjustment by the wireless base station that is the junction base station illustrated in FIG. 3.

FIG. 9 is a diagram illustrating a first example of the frame timing adjustment by the wireless base station 10-10 that is the junction base station illustrated in FIG. 3. Here, a frame timing 34 generated from the frame timing 31 of the upper wireless base station 10-5 installed on the priority synchronization path 21 is adjusted so as to come close to the frame timing 32 of the upper wireless base station 10-9 installed on the non-priority synchronization path 22. Specifically, in the first example illustrated in FIG. 9, the adjusted frame timing 33 of the wireless base station 10-10 is a median of the frame timing 31 of the wireless base station 10-5 and the frame timing 32 of the wireless base station 10-9.

Figure 10:
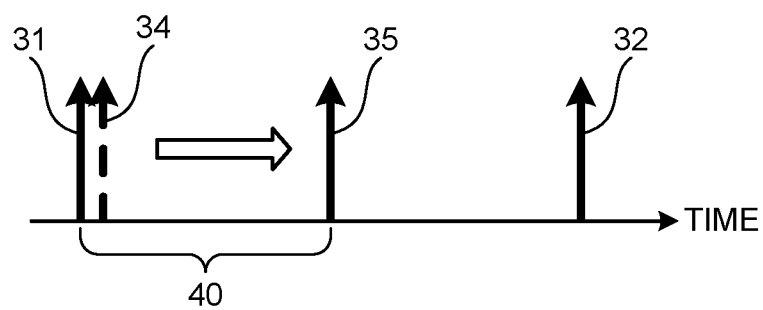
FIG. 10 is a diagram illustrating a second example of frame timing adjustment by the wireless base station that is the junction base station illustrated in FIG. 3.

The frame timing of the wireless base station 10-10 can also be determined on the basis of the maximum allowable synchronization error 40. FIG. 10 is a diagram illustrating a second example of the frame timing adjustment by the wireless base station 10-10 that is the junction base station illustrated in FIG. 3. In the second example illustrated in FIG. 10, an adjusted frame timing 35 of the wireless base station 10-10 can be set at a point obtained by bringing the frame timing 31 of the wireless base station 10-5 close to the frame timing 32 of the wireless base station 10-9 by the maximum allowable synchronization error 40. Note that the wireless base station 10-10 can compare the frame timing 33 using the median, with the frame timing 35 using the maximum allowable synchronization error 40, and determine that the frame timing closer to the frame timing 32 of the wireless base station 10-9 is an adjusted frame timing of the wireless base station 10-10. In this case, in the examples of FIGS. 9 and 10, the frame timing 35 illustrated in FIG. 10 is to be used by the wireless base station 10-10.

Note that the notification information message transmitted in step S206 of FIG. 8 is received by each of the wireless base stations 10-5 and 10-9. The wireless base station 10-5, which is located on the priority synchronization path 21, discards the notification information message from the wireless base station 10-10. The wireless base station 10-9, which is located on the non-priority synchronization path 22, adjusts the frame timing of the wireless base station 10-9 itself on the basis of the timing adjustment information contained in the notification information message. Hereinafter, the frame timing adjustment processing by the wireless base station 10-9 will be described.

Figure 11:
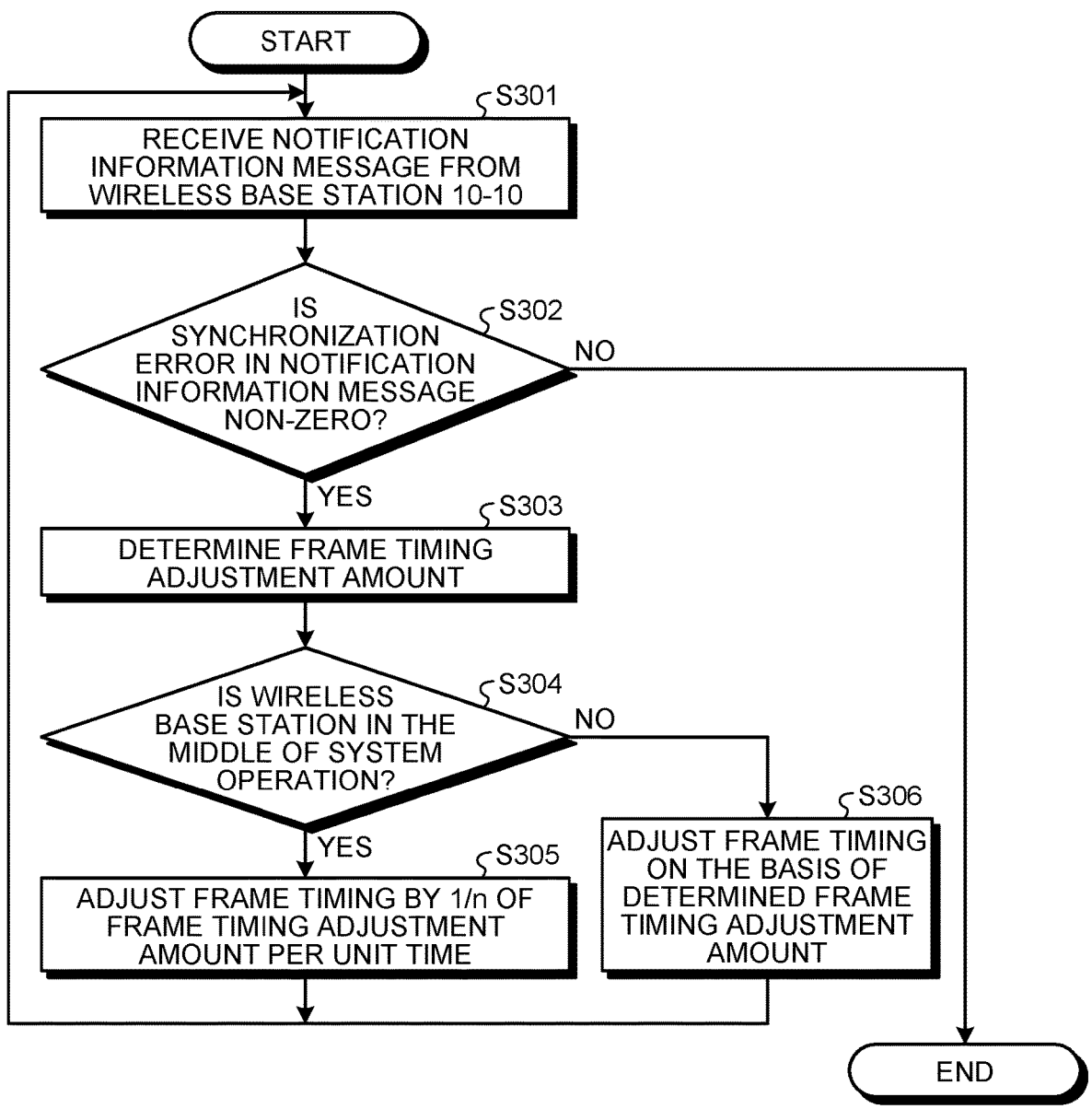
FIG. 11 is a flowchart illustrating frame timing adjustment processing by the wireless base station illustrated in FIG. 3.

FIG. 11 is a flowchart illustrating the frame timing adjustment processing by the wireless base station 10-9 illustrated in FIG. 3. The wireless base station 10-9 receives the notification information message from the wireless base station 10-10 (step S301). The wireless base station 10-9 determines whether or not the synchronization error in the notification information message received is non-zero (step S302).

If the synchronization error is zero (No in step S302), the wireless base station 10-9 need not adjust the frame timing and thus ends the processing. If the synchronization error is non-zero (Yes in step S302), the wireless base station 10-9 determines a frame timing adjustment amount for the wireless base station 10-9 on the basis of the second timing adjustment amount contained in the timing adjustment information (step S303).

Next, the wireless base station 10-9 determines whether or not the wireless base station 10-9 is in the middle of system operation (step S304). The phrase "in the middle of system operation" means that the wireless base station 10-9 is in communication with a wireless terminal. If the wireless base station 10-9 in the middle of system operation adjusted the frame timing at once by the frame timing adjustment amount determined in step S303 (Yes in step S304), an abrupt change in the frame timing would occur, which possibly results in interruption of the communication with the wireless terminal or a failure of the wireless terminal to conduct handover. To avoid this, the wireless base station 10-9 in the middle of system operation adjusts the frame timing in a plurality of stages, or adjusts the frame timing by 1/n of the frame timing adjustment amount per unit time (step S305). The value of "n" may be set in advance in the wireless base station 10-9, or may be set by an external device when the wireless base station 10-9 starts. If not in the middle of system operation (No in step S304), the wireless base station 10-9 adjusts the frame timing of the wireless base station 10-9 on the basis of the frame timing adjustment amount determined in step S303 (step S306). The wireless base station 10-9 adjusts the frame timing by the processing of step S305 or S306, and then returns to the processing of step S301. Therefore, the wireless base station 10-9 repeats the processing illustrated in FIG. 11 until the synchronization error in the notification information message becomes zero.

The wireless base station 10-9 performs processing similar to the processing illustrated in FIG. 8, after adjusting its own frame timing. Here, the wireless base station 10-5 and the wireless base station 10-9 in FIG. 8 are replaced with the wireless base station 10-8 and the wireless base station 10-10, respectively. Moreover, the synchronization timing information in step S204 is replaced with the synchronization timing information and the timing adjustment information.

Similarly, as for the wireless base stations 10-8, 10-7, and 10-6 on the non-priority synchronization path 22, the processing similar to the processing illustrated in FIG. 8 is performed by the lower wireless base station 10 then by the upper wireless base station 10 in the order of the wireless base stations 10-8, 10-7, and 10-6. As a result, the wireless base stations 10-8, 10-7, and 10-6 each adjust the frame timing on the basis of the synchronization error measured by the wireless base station 10-10.

Figure 12:
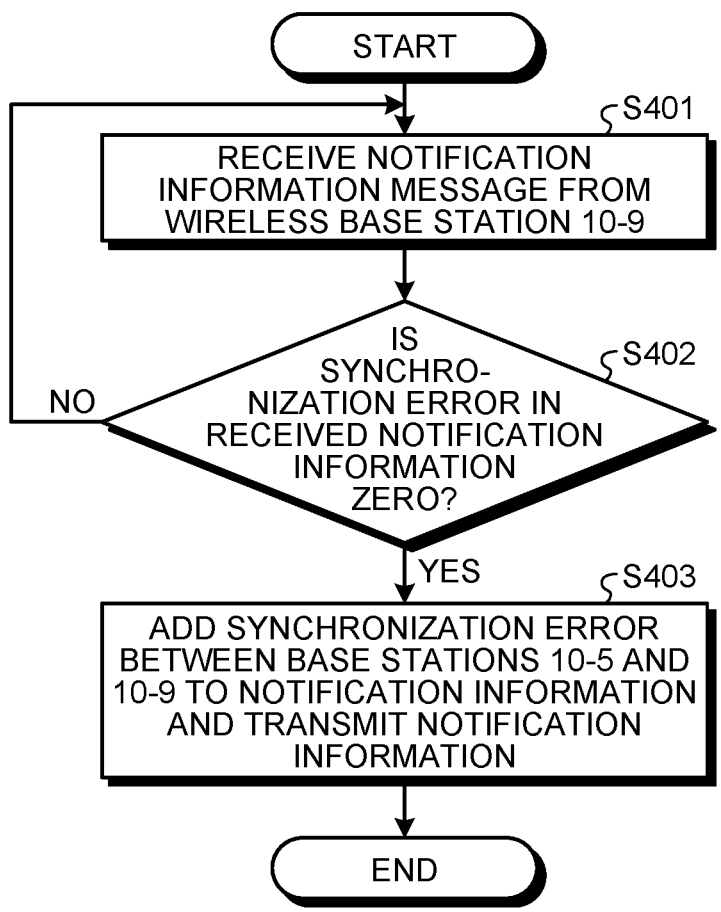
FIG. 12 is a flowchart illustrating start processing for second and subsequent rounds of a timing adjustment instruction made by the wireless base station that is the junction base station illustrated in FIG. 3.

FIG. 12 is a flowchart illustrating start processing for second and subsequent rounds of a timing adjustment instruction made by the wireless base station 10-10 that is the junction base station illustrated in FIG. 3. When determining that the synchronization error is less than or equal to the threshold in step S208 of FIG. 8, the wireless base station 10-10 sets the synchronization error in the notification information to zero and transmits the information in step S209. After performing the processing of step S209, the wireless base station 10-10 has completed the frame timing adjustment instruction to the wireless base station 10-9 for the moment. When the wireless base station 10-10 thereafter detects a synchronization error between the wireless base stations 10-5 and 10-9, the processing of FIG. 12 starts again.

The wireless base station 10-10 receives the notification information message from the wireless base station 10-9 (step S401). The wireless base station 10-10 determines whether or not the synchronization error in the notification information contained in the notification information message received is zero (step S402). If the synchronization error is zero (Yes in step S402), the wireless base station 10-10 adds the synchronization error between the wireless base stations 10-5 and 10-9 to the notification information and transmits the information (step S403). If the synchronization error is non-zero (No in step S402), the wireless base station 10-10 repeats the processing from step S401.

The frame timing adjustment instruction contained in the notification information message from the wireless base station 10-9 is directed to the wireless base station 10-8. Therefore, when the synchronization error contained in the notification information message received in step S401 is non-zero with the wireless base station 10-9 issuing the frame timing adjustment instruction to the wireless base station 10-8, issuance of the frame timing adjustment instruction to the wireless base station 10-9 can result in excess control of the timing adjustment instruction to the wireless base station 10-8 or an inconsistent instruction. The wireless base station 10-10 thus executes the processing of step S403 only when the wireless base station 10-9 has not issued the frame timing adjustment instruction to the wireless base station 10-8.

Upon receiving the notification information message containing the frame timing adjustment instruction from the wireless base station 10-10, the wireless base station 10-9 repeats the processing illustrated in FIG. 11 and the processing illustrated in FIG. 8 again. This results in reducing the difference between the frame timing on the priority synchronization path 21 and the frame timing on the non-priority synchronization path 22.

Note that in the above description, the wireless base station 10-10 repeats the processing illustrated in FIG. 8 until the synchronization error becomes less than or equal to the threshold, but if the synchronization error does not become less than or equal to the threshold after a lapse of a predetermined time, the wireless base station 10-10 may set the synchronization error in the notification information to zero and end the adjustment of the frame timing for the moment.

As described above, according to the first embodiment, the wireless communication system 1 includes the plurality of wireless base stations 10 each determining the frame timing on the basis of the synchronization timing information received from the upper wireless base station 10 and notifies the lower wireless base station 10 of the synchronization timing information. The wireless communication system 1 includes the communication paths from the uppermost one 10-1 of the plurality of wireless base stations 10-1 to 10-10 toward the lowermost one 10-10 of the plurality of wireless base stations 10-1 to 10-10, and the communication paths includes the branch point and the merge point. The junction base station, which is the wireless base station 10-10 installed at the merge point, measures the synchronization error between the priority synchronization path 21, which is one of the plurality of communication paths from the branch point to the merge point, and the non-priority synchronization path 22. Each of the plurality of wireless base stations 10-9, 10-8, 10-7, and 10-6 installed on the non-priority synchronization path 22 adjusts the frame timing on the basis of the synchronization error. As a result, the frame timing of each wireless base station 10 is adjusted so as to reduce the synchronization error in the wireless base station 10-10 that is the junction base station. It is thus possible to resolve a loss of synchronization at the merge point of the plurality of synchronization paths including the plurality of synchronization paths separated by the obstruction 20 and the error in the frame timing is accumulated.

Second Embodiment

FIG. 13 is a diagram illustrating a configuration of a wireless communication system 2 according to a second embodiment. The wireless communication system 2 includes a plurality of wireless base stations 10-1 to 10-18. Hereinafter, as with the first embodiment, the wireless base stations 10-1 to 10-18 will be simply referred to as wireless base stations 10 when need not be distinguished from each other. Also in the second embodiment, parts that are different from those of the first embodiment will be mainly described, and parts that are similar to those of the first embodiment will not be described.

In the wireless communication system 2, a communication path from the upper wireless base station 10 to the lower wireless base station 10 includes a plurality of branch points and a plurality of merge points. The wireless base stations 10-10 and 10-14 can receive synchronization timing information from a plurality of the upper wireless base stations 10. Moreover, the wireless base stations 10-1 to 10-5 and the wireless base stations 10-6 to 10-9 are separated by an obstruction 20-1 that is radio-wave opaque impervious to radio waves, and the wireless base stations 10-11 to 10-13 and the wireless base stations 10-15 to 10-18 are separated by an obstruction 20-2. At this time, the synchronization path is separated into a path through the wireless base stations 10-2 to 10-5 and a path through the wireless base stations 10-6 to 10-9, and these paths are merged at the wireless base station 10-10. Moreover, the synchronization path is separated into a path through the wireless base stations 10-10 to 10-13 and a path through the wireless base stations 10-15 to 10-18, and these paths are merged again at the wireless base station 10-14.

In this case, the wireless base stations 10-1 to 10-10 need only perform the operation similar to that of the first embodiment, and the wireless base stations 10-9 to 10-18 each need only perform the operation similar to that of the corresponding wireless base stations 10-1 to 10-10 of the first embodiment.

According to the second embodiment described above, even when the synchronization path includes the plurality of branch points and the plurality of merge points, the frame timing of each wireless base station 10 is adjusted such that the synchronization errors at the wireless base stations 10-10 and 10-14 being junction base stations are reduced. It is thus possible to resolve a loss of synchronization at the merge points of the plurality of synchronization paths when the synchronization path is separated into the plurality of synchronization paths by the obstructions 20-1 and 20-2 and the error in the frame timing is accumulated.

The configuration illustrated in the above embodiment merely illustrates an example of the content, and can thus be combined with another known technique or partially omitted and/or modified without departing from the scope.

For example, the number of the wireless base stations 10 illustrated in the wireless communication systems 1 and 2 is an example, and the number of the wireless base stations 10 disposed on the branched path is not limited to that of the illustrated example. The larger the number of the wireless base stations 10 disposed on the branched path, the larger the accumulated error, whereby it is effective to adjust the frame timing by applying the techniques of the first and second embodiments.

What is claimed is:

1. A wireless communication system comprising a plurality of wireless base stations, wherein
wireless base stations other than an uppermost wireless base station among the plurality of wireless base stations each determine a frame timing on the basis of synchronization timing information received from an upper wireless base station, and wireless base stations other than a lowermost wireless base station among the plurality of wireless base stations each notify the lower wireless base station of the synchronization timing information,
a communication path from the uppermost wireless base station to the lowermost wireless base station includes a branch point and a merge point,
a junction base station that is the wireless base station installed at the merge point measures a synchronization error between a priority synchronization path and a non-priority synchronization path different from the priority synchronization path, the priority synchronization path being one of a plurality of communication paths from the branch point to the merge point, and
the wireless base station installed on the non-priority synchronization path adjusts the frame timing on the basis of the synchronization error.

2. The wireless communication system according to claim 1, wherein the junction base station measures the synchronization error on the basis of a plurality of pieces of the synchronization timing information received from a plurality of the upper wireless base stations, generates timing adjustment information on the basis of the measured synchronization error, and notifies the upper wireless base station installed on the non-priority synchronization path of the generated timing adjustment information.

3. The wireless communication system according to claim 2, wherein the junction base station adjusts the frame timing on the basis of the synchronization error before notifying of the timing adjustment information.

4. The wireless communication system according to claim 3, wherein the junction base station adjusts the frame timing determined on the basis of the synchronization timing information received from the upper wireless base station installed on the priority synchronization path such that the adjusted frame timing is close to the frame timing of the upper wireless base station installed on the non-priority synchronization path.

5. The wireless communication system according to claim 4, wherein the junction base station adjusts the frame timing on the basis of a maximum allowable value of the synchronization error.

6. The wireless communication system according to claim 5, wherein the junction base station determines that the frame timing of the junction base station is one of: a median of the frame timing on the priority synchronization path and the frame timing on the non-priority synchronization path; and a frame timing adjusted to be close to the frame timing on the non-priority synchronization path, using the maximum allowable value from the frame timing on the priority synchronization path, the one of the median and the adjusted frame timing differing from the frame timing on the non-priority synchronization path by an error smaller than an error by which the other differs from the frame timing on the non-priority synchronization path.

7. The wireless communication system according to claim 3, wherein the junction base station generates the timing adjustment information, taking, as the synchronization error, a difference between the adjusted frame timing and the frame timing on the non-priority synchronization path.

8. The wireless communication system according to claim 2, wherein the wireless base station notified of the timing adjustment information adjusts, on the basis of the timing adjustment information notified thereto, the frame timing determined on the basis of the synchronization timing information received from the upper wireless base station.

9. The wireless communication system according to claim 1, wherein the wireless base station on the non-priority synchronization path adjusts the frame timing in a plurality of stages when the wireless base station is in the middle of communication with a wireless terminal.

10. The wireless communication system according to claim 1, wherein the communication path from the upper wireless base station to the lower wireless base station includes a plurality of the branch points and a plurality of the merge points.

11. The wireless communication system according to claim 2, wherein the synchronization timing information and the timing adjustment information are notified using a control information message dedicated to synchronization or a notification information message.

12. A wireless communication method comprising:
at each of wireless base stations other than an uppermost wireless base station among a plurality of wireless base stations, determining a frame timing on the basis of synchronization timing information received from an upper wireless base station;
at each of wireless base stations other than a lowermost wireless base station among the plurality of wireless base stations, notifying the lower wireless base station of the synchronization timing information;
at a junction base station that is the wireless base station installed at a merge point of a communication path from the uppermost wireless base station to the lowermost wireless base station, measuring a synchronization error between a priority synchronization path and a non-priority synchronization path different from the priority synchronization path, the priority synchronization path being one of a plurality of the communication paths from a branch point of the communication path to the merge point of the communication path; and
at each of the plurality of wireless base stations installed on the non-priority synchronization path, adjusting the frame timing on the basis of the synchronization error.

13. A non-transitory storage medium of a wireless communication system comprising a plurality of wireless base stations,
a communication path from an uppermost wireless base station among the plurality of wireless base stations to a lowermost wireless base station among the plurality of wireless base stations including a branch point and a merge point, wherein
the storage medium stores a program that when executed by a processor to perform:
a process of allowing each of wireless base stations other than the uppermost wireless base station among the plurality of wireless base stations to determine a frame timing on the basis of synchronization timing information received from an upper wireless base station;
a process of allowing each of wireless base stations other than the lowermost wireless base station among the plurality of wireless base stations to notify the lower wireless base station of the synchronization timing information;
a process of allowing a junction base station that is the wireless base station installed at the merge point to measure a synchronization error between a priority synchronization path and a non-priority synchronization path different from the priority synchronization path, the priority synchronization path being one of a plurality of communication paths from the branch point to the merge point; and
a process of allowing the wireless base station installed on the non-priority synchronization path to adjust the frame timing on the basis of the synchronization error.

* * * * *